(12) United States Patent
Chen et al.

(10) Patent No.: US 9,155,107 B2
(45) Date of Patent: Oct. 6, 2015

(54) RANDOM ACCESS METHOD FOR RELAY NODES

(75) Inventors: Si Chen, Shenzhen (CN); Yincheng Zhang, Shenzhen (CN); Yada Huang, Shenzhen (CN); Qian Dai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 495 days.

(21) Appl. No.: 13/260,160

(22) PCT Filed: Jun. 11, 2010

(86) PCT No.: PCT/CN2010/073836
§ 371 (c)(1),
(2), (4) Date: Dec. 19, 2011

(87) PCT Pub. No.: WO2010/145505
PCT Pub. Date: Dec. 23, 2010

(65) Prior Publication Data
US 2012/0099515 A1    Apr. 26, 2012

(30) Foreign Application Priority Data
Jun. 20, 2009   (CN) .......................... 2009 1 0150359

(51) Int. Cl.
*H04W 4/00*   (2009.01)
*H04W 74/00*  (2009.01)
*H04B 7/155*  (2006.01)
*H04W 36/00*  (2009.01)
(Continued)

(52) U.S. Cl.
CPC ............. *H04W 74/006* (2013.01); *H04B 7/155* (2013.01); *H04W 36/0072* (2013.01); *H04W 74/0833* (2013.01); *H04W 84/047* (2013.01)

(58) Field of Classification Search
CPC ..... H04W 48/18; H04W 72/04; H04W 36/00; H04W 24/00; H04W 74/0833; H04W 72/0406; H04W 72/042; H04W 4/00
USPC .................................. 370/310–350, 431–463
See application file for complete search history.

(56) References Cited

U.S. PATENT DOCUMENTS

2010/0302998 A1   12/2010  Bao et al.
2012/0039239 A1*  2/2012   Park et al. ..................... 370/315
(Continued)

FOREIGN PATENT DOCUMENTS

CN   101316134 A   12/2008
CN   101448325 A   6/2009
(Continued)

OTHER PUBLICATIONS

International Search Report dated Sep. 16, 2010 for PCT/CN2010/073836, filed Jun. 11, 2010.
(Continued)

*Primary Examiner* — Ricky Ngo
*Assistant Examiner* — Wei-Po Kao
(74) *Attorney, Agent, or Firm* — Knobbe, Martens, Olson & Bear, LLP

(57) ABSTRACT

The present invention discloses methods for random access of a Relay Node (RN), which includes one method for random access wherein a RN monitors R-PDCCH and receives a random access response message according to a random access-radio network temporary identifier through the R-PDCCH. By the present invention, the random access procedure of the RN is achieved.

15 Claims, 4 Drawing Sheets

(51) Int. Cl.
*H04W 74/08* (2009.01)
*H04W 84/04* (2009.01)

(56) References Cited

U.S. PATENT DOCUMENTS

2012/0069790 A1* 3/2012 Chung et al. .................. 370/315
2012/0082088 A1* 4/2012 Dalsgaard et al. ............ 370/315
2013/0294310 A1* 11/2013 Yl et al. ........................ 370/311

FOREIGN PATENT DOCUMENTS

CN 101932103 A 12/2010
WO WO 2008/097023 A1 8/2008

OTHER PUBLICATIONS

International Preliminary Report on Patentability dated Dec. 20, 2011 for PCT/CN2010/073836, filed Jun. 11, 2010.

* cited by examiner

RANDOM ACCESS METHOD FOR RELAY NODES

CROSS REFERENCE TO RELATED APPLICATIONS

This application is the U.S. National Phase application under 35 U.S.C. §371 of International Application PCT/CN2010/073836 filed Jun. 11, 2010, which claims priority to Chinese Application 200910150359.6 filed Jun. 20, 2009.

FIELD OF THE INVENTION

The present invention relates to the communication field, and in particular to a method for random access of relay nodes.

BACKGROUND OF THE INVENTION

Currently, the Third Generation Partnership Projects (3GPP) launched a standard of the Long-Term Evolution advance (LTE-Advanced). The LTE-Advanced which is a relative improvement of Long-Term Evolution (LTE) retains the core of LTE, based on which a series of technologies are used to extend the frequency domain and space domain so as to improve utilization rate of spectrum, increase capacity of system or the like. The wireless relay is one of the LTE-Advanced technologies and is intended to expand the coverage of the cell, reduce the corner areas in the communication, balance the load, transfer the services of the hotspot areas, and save the transmission power of the terminal (or namely user equipment, abbreviated as UE).

FIG. 1 is a schematic diagram of the network architecture using the wireless relay technology according to the prior art. As shown in FIG. 1, some new Relay Nodes (RNs) are added between the original Donor eNodeB (Donor-eNB) and UE, and these newly added RNs are wirelessly connected to the Donor-eNB, but are in the wired connection with the transmission network, wherein the radio link between the Donor-eNB and the RN is called as backhaul link and the radio link between the RN and the UE is called as access link. The downlink data first arrives at the Donor-eNB and then are transmitted to the RN, and afterwards the RN transmits it to the UE. The uplink data has the process inverted with the downlink data, which is not described in detail herein.

In order to configure resource of the backhaul link, Relay Physical Downlink Control Channel (R-PDCCH), Relay-Physical Dedicated Downlink Shared Channel (R-PDSCH), and Relay Physical Uplink Shared Channel (R-PUSCH) are defined. The resource of R-PDCCH, starting from an Orthogonal Frequency Division Multiplexing (OFDM) symbol received by the RN, can be partial Physical Resource Blocks (PRBs) in a subframe used for the downlink transmission of the backhaul link, or can also be partial OFDM symbols or all the OFDM symbols in a subframe used for the downlink transmission of the backhaul link.

FIG. 2 is a schematic diagram of the frame structure of a subframe used for the downlink transmission of the backhaul link according to the prior art. As shown in FIG. 2, the R-PDCCH is used to allocate an R-PDSCH resource and an R-PUSCH resource dynamically or semi-statically, wherein the R-PDSCH resource is used to transmit the downlink data of the backhaul link and the R-PUSCH resource is used to transmit the uplink data of the backhaul link. Considering the compatibility with the existing terminals and in order to avoid the transmission between the relay node and the base station has conflict with the transmission between the relay node and the terminal, the relay node monitors during normal transmission process the Downlink Assignment, Uplink Grant and the like which are indicated by the base station on the R-PDCCH, and then achieves the transmission between the relay node and the base station on the corresponding R-PDSCH and R-PUSCH. In addition, the relay node indicates Downlink Assignment, Uplink Grant and the like on Physical Downlink Control Channel (PDCCH) and achieves the transmission between the relay node and the terminal on the corresponding Physical Downlink Shared Channel (PDSCH) and Physical Uplink Shared Channel (PUSCH).

Before the normal transmission process, the relay node in idle state (RRC_IDLE) needs to initially access the network by a random access procedure, and the relay node in the connected state (RRC_CONNECTED) needs to synchronize with the network and acquire resource allocation by the random access procedure so as to carry out subsequent data communication.

In a LTE system, the random access procedure can be triggered by any one of the following five events: (1) initial access in idle state; (2) initial access after Radio Link Failure (RLF); (3) Handover (HO); (4) downlink data being arrived in the connected state; and (5) uplink data being arrived in the connected state. Moreover, there are two different manners of the random access procedure: Contention Based (which is applicable for all the above five events); and Non-contention Based (which is only applicable for the above two events (3) and (4)). After the random access procedure is successful, normal downlink or uplink transmission can be carried out.

FIG. 3 is an interacted flow chart of the random access procedure in the manner of Contention Based according to the prior art. As shown in FIG. 3, the random access procedure in the manner of Contention Based comprises the following four steps.

Step 1: a terminal sends a random access preamble through Random Access Channel (RACH) in uplink.

Step 2: the Media Access Control (MAC) layer of base station generates a Random Access Response (RAR) message and sends the generated RAR message to the terminal through DownLink Shared Channel (DL-SCH), wherein the RAR message at least contains Random Access Preamble Identifier (RAPID), Time Alignment (TA) information, initial Uplink Grant (UL Grant) and temporary Cell-Radio Network Temporary Identifier (Temporary C-RNTI); and the RAR message is indicated by Random Access-Radio Network Temporary Identifier (RA-RNTI) on the Physical Downlink Control Channel (PDCCH).

Step 3: the terminal sends a first Scheduled Transmission message on the Uplink-Shared Channel (UL-SCH), wherein the content of the Scheduled Transmission message at least contains Cell-Radio Network Temporary Identifier (C-RNTI) Media Access Control element (MAC Control Element) or Common Control logic Channel Service Data Unit (CCCH SDU); and the process of sending this Scheduled Transmission message can be supported by the Hybrid Automatic Retransmission reQuest (HARQ).

Step 4: the base station sends a Contention Resolution message on the DL-SCH, wherein the Contention Resolution message is indicated by the C-RNTI or the Temporary C-RNTI on the PDCCH, and the process of sending this Contention Resolution message can be supported by the HARQ.

FIG. 4 is a random access procedure in the manner of Non-contention Based. As shown in FIG. 4, this random access procedure comprises the following steps.

Step 1: a base station allocates a random access preamble to a terminal through a downlink dedicated signaling, wherein in the situation of handover, the downlink dedicated signaling is generated by a target base station and sent to the terminal by a source base station using a Handover (HO) Command; and in the situation that the downlink data arrives, the downlink dedicated signaling is sent to the terminal through the PDCCH.

Step 2: the terminal sends the allocated non-contention random access preamble through the RACH in uplink.

Step 3: the base station sends the RAR message on the DL-SCH, wherein the RAR message at least contains time alignment information and the RAPID, and in the situation of handover, the RAR message further contains the UL Grant, and the RAR message is indicated by the RA-RNTI on the PDCCH.

After the random access procedure is successful, the terminal monitors the PDCCH and acquires Downlink Assignment or Uplink Grant and the like by the C-RNTI indication on the PDCCH, then performs corresponding downlink transmission or uplink transmission. It can be seen from the above-mentioned that if the RN uses the random access procedure of the terminal, the RN will monitor the PDCCH after the access is successful. The subsequent transmission can't be carried out normally.

For the problem of how the RN accesses the R-PDCCH and performs the subsequent transmission normally, no effective solution has been proposed so far.

SUMMARY OF THE INVENTION

The present invention is proposed aiming at the problem of how RN accesses the R-PDCCH and performs subsequent normal transmission, thus the main object of the present invention is to provide a method for random access of RN so as to solve at least one of the above problems.

A method for the random access of a Relay Node (RN) is provided according to one aspect of the present invention, which method comprises: the RN monitoring R-PDCCH and receiving a random access response message according to a random access-radio network temporary identifier on the R-PDCCH.

Another method for the random access of a Relay Node (RN) is provided according to another aspect of the present invention, which method comprises: the RN sending a random access preamble according to RN-dedicated random access resource; the RN monitoring R-PDCCH, receiving a RN-dedicated random access response message according to a random access-radio network temporary identifier on the R-PDCCH, and sending a first scheduled transmission through the Relay Physical Uplink Shared Channel (R-PUSCH) according to the Uplink Grant information in the RN-dedicated random access response message; and the RN monitoring the R-PDCCH and receiving a Contention Resolution message according to a cell-radio network temporary identifier or a temporary cell-radio network temporary identifier on the R-PDCCH.

A method for the random access of a relay node (RN) is provided according to another aspect of the present invention, which method comprises: the RN monitoring Physical Downlink Control Channel (PDCCH) and receiving a RN-dedicated random access response message according to a Random Access-Radio Network Temporary Identifier (RA-RNTI) on the PDCCH.

A method for the random access of a relay node (RN) is further provided according to another aspect of the present invention, which method comprises: the RN sending to a base station a dedicated signaling carrying RN identification information or a MAC control element carrying RN identification information according to the Uplink Grant information in a random access response message; and the RN monitoring Physical Downlink Control Channel (PDCCH) and receiving a RN-dedicated Contention Resolution message according to a Cell-Radio Network Temporary Identifier (C-RNTI) or a temporary cell-radio network temporary identifier on the PDCCH.

By the present invention, it is realized that the RN accesses the R-PDCCH randomly, thus RN can monitor the R-PDCCH after the random access and perform normal transmission.

BRIEF DESCRIPTION OF THE DRAWINGS

The drawings illustrated here provide a further understanding of the present invention and form a part of the present application. The exemplary embodiments of the present invention and the description thereof are used to explain the present invention without unduly limiting the scope of the present invention. In the drawings.

DETAILED DESCRIPTION OF EMBODIMENTS

It should be noted that the embodiments of the present application and the features in the embodiments can be combined with each other if there is no conflict. The present invention is described in detail with reference to the accompanying drawings and in combination with the embodiments in the following.

Embodiment I

A method for the random access of a RN is provided according to the embodiments of the present invention, and in particular, a method for the random access of the RN in the manner of Non-contention Based is provided. In this method, preferably, the following steps are performed: the RN sending the identification information of the RN to a base station; the RN acquiring Relay Physical Downlink Control Channel (R-PDCCH) resource from the base station; and the RN monitoring the R-PDCCH and receiving a RN-dedicated RAR message according to a RA-RNTI on the R-PDCCH.

Figure 1:
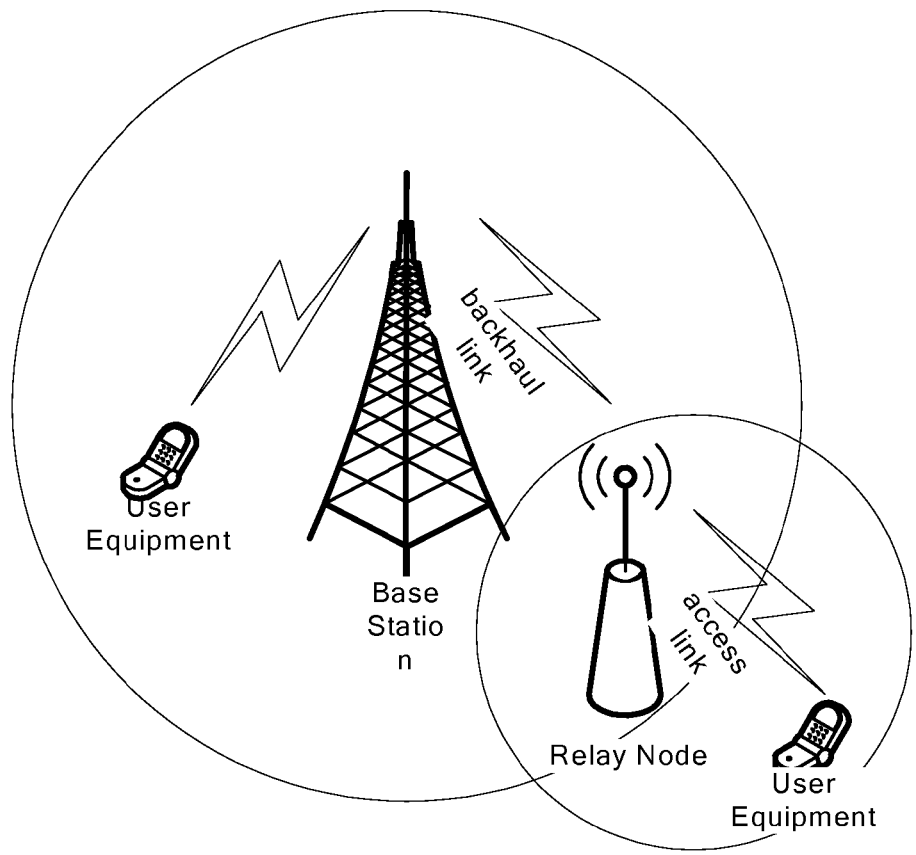
FIG. 1 is a schematic diagram of the network architecture using the wireless relay technology according to the prior art.
Figure 2:
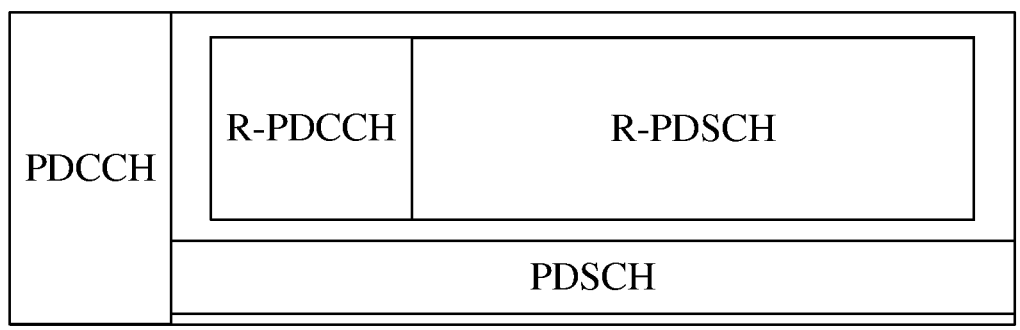
FIG. 2 is a schematic diagram of the frame structure of a subframe used for the downlink transmission of the backhaul link according to the prior art.
Figure 3:
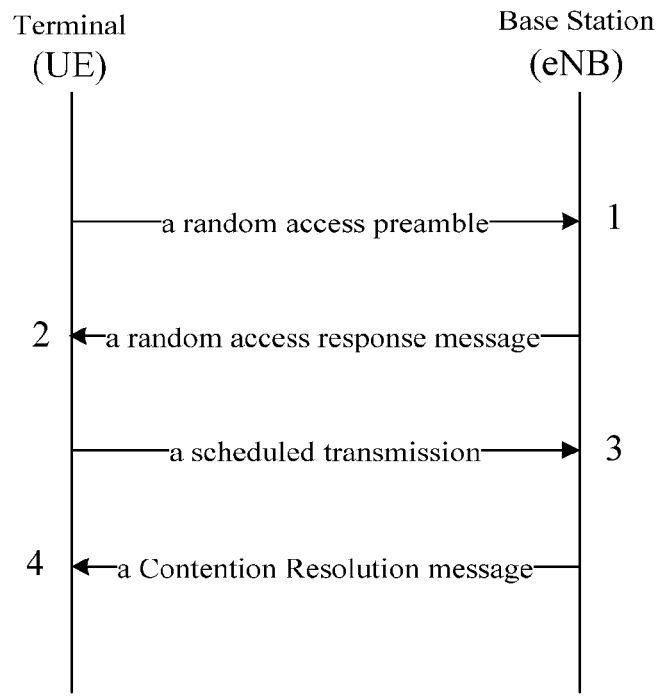
FIG. 3 is an interaction flow chart of random access procedure in the manner of Contention Based according to the prior art.
Figure 4:
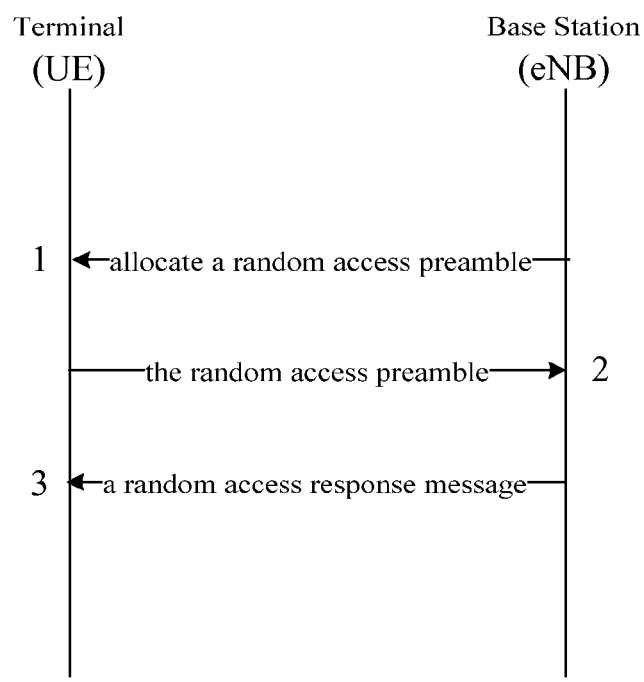
FIG. 4 is an interaction flow chart of random access procedure in the manner of Non-contention Based according to the prior art.
Figure 5:
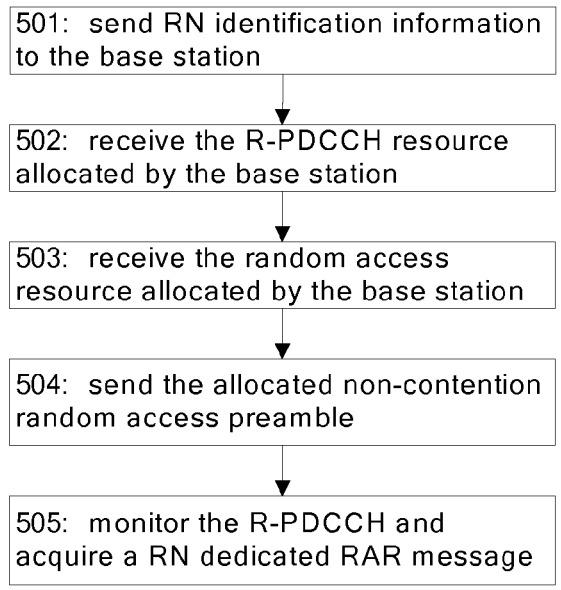
FIG. 5 is a flow chart according to preferred embodiment I of the present invention.

As shown in FIG. 5, the RN performs a random access procedure in the manner of Non-contention Based by monitoring the R-PDCCH, which comprises the following steps.

Step 501: before the random access procedure, the base station has known that the access node is a RN.

In particular, the RN informs the base station that the RN itself is a RN by a dedicated signaling such as a RRC connection establishment request message, a RRC connection reestablishment request message or a RRC connection establishment reconfiguration completion message, or by a MAC control element such as a C-RNTI MAC control element, which can be achieved by sending RN identification information to the base station. For a random access procedure in the manner of Non-contention Based triggered by a handover, a source base station and a target base station perform information interaction such that the target base station learns that the access node is a RN.

Step 502: before the random access procedure, the base station allocates R-PDCCH resource for the RN.

In particular, the RN acquires the R-PDCCH resource by system information (such as system information block 2) or by a dedicated signaling such as RRC connection establishment message, RRC connection reestablishment message or RRC connection establishment reconfiguration message, or by a newly added MAC control element. For the random access procedure in the manner of Non-contention Based triggered by a handover, the RN may further acquire the R-PDCCH resource by a dedicated signaling such as a RRC connection reconfiguration message for allocating random access resource in Step 503. It should be noted that the order of performing Step 501 and Step 502 is not limited in the present invention and can be set flexibly according to the requirements of the implementation, namely, Step 501 can be performed before or after Step 502.

Step 503: the base station allocates random access resource for the RN.

In particular, the random access resource may be the existing UE random access resource or may also be RN-dedicated random access resource.

For the random access procedure in the manner of Non-contention Based triggered by a handover, the base station may allocate the random access resource for the RN by a dedicated signaling (such as a RRC connection reconfiguration message).

For a random access procedure in the manner of Non-contention Based triggered by the arriving of the downlink data in the connected state, the base station allocates the random access resource for the RN by downlink control information (such as 1a in DCI format).

Step 504: the RN sends the allocated non-contention random access preamble.

Step 505: the base station sends a RN-dedicated RAR message on the R-PDSCH.

The RN-dedicated RAR message at least contains time alignment information and a random access preamble identifier (which may be RN-dedicated), and further contains initial Uplink Grant information on the R-PUSCH in the situation of handover; and this message can be indicated by a random access-radio network temporary identifier on the R-PDCCH.

By this embodiment, the random access procedure of a RN in the manner of Non-contention Based is achieved.

For the problem in the prior art that the RN does not have relay function after the access according to the existing procedure and cannot indicate Downlink Assignment or Uplink Grant for the managed UE on the PDCCH, this embodiments of the present invention provide a solution on random access of the RN, in which the RN randomly accesses the R-PDCCH so as to achieve the effect that the RN can monitor the R-PDCCH after the random access and perform normal transmission.

Embodiment II

A method for the random access of a RN is provided according to the embodiments of the present invention, and in particular, a method for the random access of the RN in the manner of Contention Based is provided. In this method, preferably, the following steps are performed: the RN sending identification information to a base station; the RN acquiring RN-dedicated random access resource from the base station; the RN sending a random access preamble according to the RN-dedicated random access resource; the RN acquiring Relay Physical Downlink Control Channel (R-PDCCH) resource from the base station; the RN monitoring the R-PDCCH, receiving a RN-dedicated random access response message according to a random access-radio network temporary identifier on the R-PDCCH, and sending a first scheduled transmission through Relay Physical Uplink Shared Channel (R-PUSCH) according to Uplink Grant information in the RN-dedicated random access response message; and the RN monitoring the R-PDCCH and receiving a Contention Resolution message according to a cell-radio network temporary identifier or a temporary cell-radio network temporary identifier on the R-PDCCH.

Figure 6:
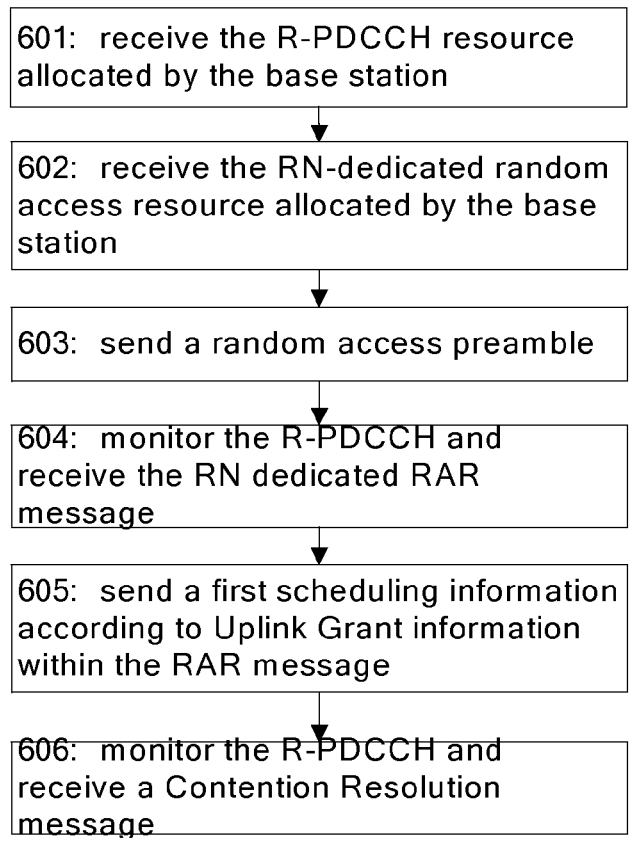
FIG. 6 is a flow chart according to preferred embodiment II of the present invention.

As shown in FIG. 6, the RN performs a random access procedure in the manner of Contention Based by monitoring the R-PDCCH, which comprises the following steps.

Step 601: before the random access procedure, the base station allocates R-PDCCH resource for the RN.

For the random access procedure in the manner of Contention Based triggered by an initial access, the RN acquires the R-PDCCH resource by system information (such as system information block 2).

For the random access procedure in the manner of Contention Based after the radio link is failed, which is triggered by an initial access, the arriving of downlink data in the connected state and the arriving of uplink data in the connected state, the RN acquires the R-PDCCH resource by system information (such as system information block 2), a dedicated signaling (such as RRC connection establishment message/RRC connection reestablishment message/RRC connection establishment reconfiguration message) or a newly added MAC control element.

For the random access procedure in the manner of Contention Based triggered by a handover, the RN acquires the R-PDCCH resource by a dedicated signaling (such as RRC connection reconfiguration message).

Step 602: before the random access procedure, the base station allocates RN-dedicated random access resource for the RN.

For the random access procedure in the manner of Contention Based triggered by an initial access, the RN acquires the RN-dedicated random access resource by system information (such as system information block 2).

For the random access procedure in the manner of Contention Based after the radio link is failed, which is triggered by an initial access, the arriving of downlink data in the connected state and the arriving of uplink data in the connected state, the RN acquires the RN-dedicated random access resource by system information (such as system information block 2) or a dedicated signaling (such as RRC connection establishment reconfiguration message).

For the random access procedure in the manner of Contention Based triggered by a handover, the RN acquires the RN-dedicated random access resource by a dedicated signaling (such as RRC connection reconfiguration message).

It should be noted that the sequential order of performing Step 601 and Step 602 is not limited in the present invention and can be set flexibly according to the requirements of the implementation, namely, Step 601 can be performed before or after Step 602.

Step 603: the RN sends a random access preamble through random access channel according to the RN-dedicated random access resource.

The RN may send an RN-dedicated random access preamble through random access channel of the UE, or send the random access preamble of the UE through RN-dedicated random access channel, and may further send the RN-dedicated random access preamble through the RN-dedicated random access channel.

Step 604: the base station sends a random access response message on the R-PDSCH.

The random access response message contains a random access preamble identifier (which may be dedicated for the RN (RN-dedicated)), time alignment information, initial Uplink Grant information and temporary cell-radio network temporary identifier (which may be RN-dedicated) of the R-PUSCH; and this message can be indicated by a random access-radio network temporary identifier (which may be RN-dedicated) on the R-PDCCH.

Step 605: the RN sends a first scheduling message through the R-PUSCH.

Step 606: the base station sends a Contention Resolution message through the R-PDCCH.

The Contention Resolution message is indicated by a cell-radio network temporary identifier (which may be RN-dedicated) or a temporary cell-radio network temporary identifier (which may be RN-dedicated) on the R-PDCCH.

By this embodiment, the RN random access procedure in the manner of Contention Based is achieved.

Embodiment III

Figure 7:
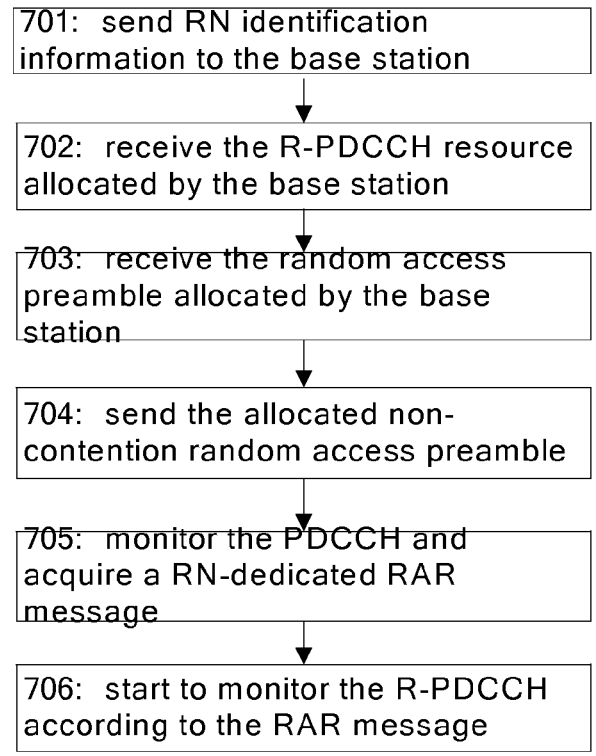
FIG. 7 is a flow chart according to preferred embodiment III of the present invention.

A method for random access of a RN is provided according to the embodiments of the present invention, and in particular, there is provided a method for the RN to perform a random access procedure in the manner of Non-contention Based by monitoring PDCCH. As shown in FIG. 7, this method comprises the following steps.

Step 701: before the random access procedure, the base station has learned that the access node is a RN.

In particular, the RN informs the base station that the RN itself is an RN by a dedicated signaling such as a RRC connection establishment request message, a RRC connection reestablishment request message or a RRC connection establishment reconfiguration completion message, or by a MAC control element such as a C-RNTI MAC control element, which can be achieved by sending RN identification information to the base station. For a random access procedure in the manner of Non-contention Based triggered by a handover, a source base station and a target base station perform information interaction such that the target base station learns that the access node is a RN.

Step 702: before the random access procedure, the base station allocates R-PDCCH resource for the RN.

For the access procedure in the manner of Non-contention Based triggered by an initial access, the RN acquires the R-PDCCH resource by system information (such as system information block 2).

For the random access procedure in the manner of Non-contention Based after the radio link is failed, which is triggered by an initial access, the arriving of downlink data in the connected state and the arriving of uplink data in the connected state, the RN acquires the R-PDCCH resource by system information (such as system information block 2), a dedicated signaling (such as RRC connection establishment message/RRC connection reestablishment message/RRC connection establishment reconfiguration message) or a newly added MAC control element.

For the random access procedure in the manner of Non-contention Based triggered by a handover, the RN acquires the R-PDCCH resource by a dedicated signaling (such as RRC connection reconfiguration message).

It should be noted that the sequential order of performing Step 701 and Step 702 is not limited in the present invention and can be set flexibly according to the requirements of the implementation, namely, Step 701 can be performed before or after Step 702.

Step 703: the base station allocates a random access preamble for the RN.

For the random access procedure in the manner of Non-contention Based triggered by a handover, the random access preamble may be a random access preamble of the UE or may also be a RN-dedicated random access preamble.

For the random access procedure in the manner of Non-contention Based triggered by the arriving of downlink data in the connected state, the random access preamble is the RN-dedicated random access preamble.

Step 704: the RN sends the allocated random access preamble.

Step 705: the RN monitors the PDCCH and receives a RN-dedicated RAR message according to the RA-RNTI indication on the PDCCH.

In the above, the RN-dedicated RAR message at least contains a random access preamble identifier and time alignment information. For the random access procedure in the manner of Non-contention Based triggered by a handover, the RN-dedicated RAR message further contains Uplink Grant information of the R-PUSCH. In addition to the above necessary information domains, the RAR message may further contain the handover time of switching from monitoring the PDCCH to monitoring the R-PDCCH. Moreover this RAR message is indicate by the RA-RNTI on the PDCCH.

Step 706: the RN starts to monitor the R-PDCCH according to the RAR message.

In the above, the step of starting to monitor the R-PDCCH in Step 706 can be performed but not limited to the following modes.

Mode I: the RN acquires the handover time of switching from monitoring the PDCCH to monitoring the R-PDCCH by the following methods: for the random access procedure in the manner of Non-contention Based triggered by the downlink data in the connected state arriving, before receiving the RAR message, the RN acquires a system frame number which starts to monitor the R-PDCCH and/or a subframe number which starts to monitor the R-PDCCH by a system message (such system information block 2); and for the random access procedure in the manner of Non-contention Based triggered by a handover, in Step 703, the RN acquires a system frame number and/or a subframe number or a time interval between the time when the RAR message is received and the time of starting to monitor the R-PDCCH within a receiving window, by a dedicated signaling (such as RRC connection establishment reconfiguration message) which is used to allocate the random access preamble. If the RAR message carries a random access preamble identifier of RN-dedicated value or a RN indication bit, then the RN will start to monitor the R-PDCCH from the system frame number and/or the subframe number, or after the time interval.

Mode II: before the above random access procedure, the RN does not acquire the handover time. If the RAR message carries a random access preamble identifier of RN-dedicated value or a RN indication bit, then the RN will start to monitor the R-PDCCH immediately, namely, the RN will start to monitor the R-PDCCH according to its own capability.

Mode III: if the RAR message carries the handover time, then the RN will start to monitor the R-PDCCH from a system frame number and/or a subframe number, or after the time interval.

Mode IV: In the case of the handover, if the RAR message carries the Uplink Grant information of the R-PUSCH, then the RN will start to monitor the R-PDCCH after a predetermined time since sending on the R-PUSCH, wherein the predetermined time depends on the processing capability of the RN, with the factor of avoiding conflict taken into consideration.

By this embodiment, the RN random access procedure in the manner of Non-contention Based is achieved.

Embodiment IV

Figure 8:
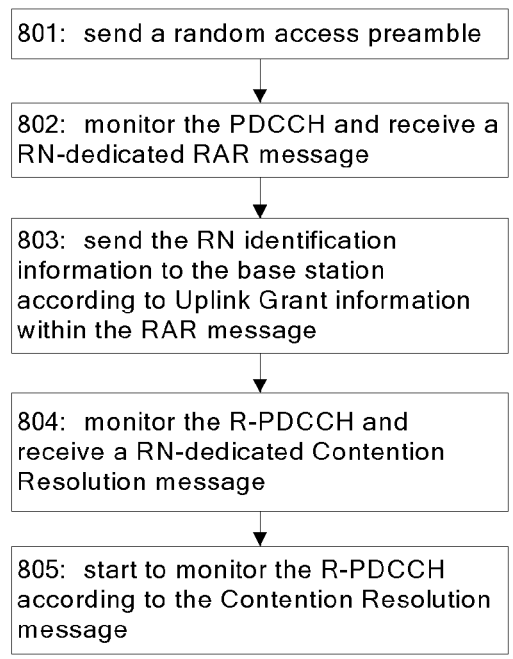
FIG. 8 is a flow chart according to preferred embodiment IV of the present invention.

A method for random access of a RN is provided according to the embodiments of the present invention, and in particular, a method for the RN to perform a random access procedure in the manner of Contention Based by monitoring PDCCH is provided. As shown in FIG. 8, this method comprises the following steps.

Step 801: a RN sends a random access preamble;

Step 802: the RN monitors the PDCCH and receives a RAR message according to the RA-RNTI indication on the PDCCH;

Step 803: the RN sends RN identification information to a base station according to Uplink Grant information in the RAR message.

For the random access procedure in the manner of Contention Based triggered by an initial access, the RN informs the base station that the RN itself is a RN by a dedicated signaling (namely, RRC connection establishment request message); for the random access procedure in the manner of Contention Based triggered by a failed radio link, the RN informs the base station that the RN itself is a RN by a dedicated signaling (namely, RRC connection reestablishment request message); for the random access procedure in the manner of Contention Based triggered by a handover, the RN informs the base station that the RN itself is a RN by a dedicated signaling (namely, RRC connection establishment reconfiguration completion message); and for the random access procedure in the manner of Contention Based triggered by the arriving of uplink/downlink data in the connected state, the RN informs the base station that the RN itself is a RN by a C-RNTI MAC control element.

Step 804: the RN monitors the PDCCH and receives a RN-dedicated Contention Resolution message according to a C-RNTI or a temporary C-RNTI indication on the PDCCH.

In particular, the RN-dedicated Contention Resolution message contains one of the following: a dedicated signaling carrying R-PDCCH resource; a dedicated signaling carrying the handover time of switching from monitoring the PDCCH to monitoring the R-PDCCH; a dedicated signaling carrying the RN identification information; a MAC control element carrying the R-PDCCH resource; a MAC control element carrying the handover time; and a Contention Resolution message of a MAC control element carried the RN identification information.

Step 805: the RN starts to monitor the R-PDCCH according to the Contention Resolution message.

In the above, besides using the RN-dedicated Contention Resolution message, the method of the RN acquiring the R-PDCCH resource further comprises:

for the random access procedure in the manner of Contention Based triggered by an initial access, the RN acquires the R-PDCCH resource by system information (such as system information block 2).

For the random access procedure in the manner of Contention Based triggered by an initial access after the radio link is failed, the arriving of downlink data in the connected state, and the arriving of uplink data in the connected state, the RN acquires the R-PDCCH resource by system information (such as system information block 2) or a dedicated signaling (such as RRC connection establishment message/RRC connection reestablishment message/RRC connection establishment reconfiguration message) or a newly added MAC control element.

For the random access procedure in the manner of Contention Based triggered by a handover, the RN acquires the R-PDCCH resource by a dedicated signaling (such as RRC connection reconfiguration message).

In the above, besides using the RN-dedicated contention resolution message, the method of acquiring the handover time can also be performed by one of the following methods: acquiring by system information (such as system information block 2) the system frame number which starts to monitor the R-PDCCH and/or the subframe number which starts to monitor the R-PDCCH; acquiring the system frame number and/or the subframe number by a dedicated signaling (such as RRC connection establishment reconfiguration message); acquiring the time interval between the time when a RAR message is received and the time of starting to monitor the R-PDCCH within a receiving window; and acquiring the system frame number and/or the subframe number and the time interval by a newly added MAC control element.

In the above, the method of starting to monitor the R-PDCCH comprises but is not limited to the following modes.

Mode I: in the case of an initial access or a failed radio link, before the above random access procedure, the RN acquires the handover time, namely, the system frame number and/or the subframe number, and the Contention Resolution message carries the RN identification information, therefore the RN will start to monitor the R-PDCCH from the system frame number and/or the subframe number.

Mode II: in the case of an initial access or a failed radio link, before the above random access procedure, the RN does not acquire the handover time and the Contention Resolution message carries the RN identification information, therefore the RN will immediately start to monitor the R-PDCCH according to its own capability.

Mode III: in the case of an initial access or a failed radio link, the Contention Resolution message carries the handover time, therefore the RN will start to monitor the R-PDCCH from the system frame number and/or the subframe number.

Mode IV: in the case of a handover or the arriving of the uplink/downlink data, before the above random access procedure, the RN acquires the handover time, namely, the system frame number and/or the subframe number or the time interval, and the Contention Resolution message carries the RN identification information, therefore the RN will start to monitor the R-PDCCH from the system frame number and/or the subframe number or after the time interval.

Mode V: in the case of a handover or the arriving of the uplink/downlink data, before the above random access procedure, the RN does not acquire the handover time and the Contention Resolution message carries the RN identification information, therefore the RN will immediately start to monitor the R-PDCCH according to its own capability.

Mode VI: in the case of a handover or the arriving of the uplink/downlink data, the Contention Resolution message carries the handover time, therefore the RN will start to monitor the R-PDCCH from the system frame number and/or the subframe number or after the time interval.

By this embodiment, the RN random access procedure in the manner of Contention Based is achieved.

In summary, by the above-mentioned embodiments of the present invention, the RN can randomly access the R-PDCCH in the manner of Contention Based or Non-contention Based, thus the RN can monitor the R-PDCCH after the random access, so as to perform normal transmission.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for random access of a Relay Node (RN), comprising:
    the RN monitoring Relay Physical Downlink Control Channel (R-PDCCH) and receiving a RN-dedicated random access response message according to a random access-radio network temporary identifier on the R-PDCCH, wherein the RN-dedicated random access response message contains RN-dedicated Uplink Grant information,
    wherein the RN-dedicated random access response message contains at least one of the following: Uplink Grant information which is used to indicate the RN to perform transmission through Relay Physical Uplink Shared Channel (R-PUSCH), handover time of switching from monitoring the PDCCH to monitoring the Relay Physical Downlink Control Channel (R-PDCCH), and a RN indication bit,
    wherein if the random access response message does not contain the handover time and the random access response message contains the Uplink Grant information of the R-PUSCH, then the RN will start to monitor the R-PDCCH after a predetermined time since sending through R-PUSCH; and if the random access response message does not contain the handover time and the random access response message does not contain the Uplink Grant information of the R-PUSCH, then the RN will start to monitor the R-PDCCH immediately, and
    wherein if the random access response message contains the handover time, then the RN will start to monitor the R-PDCCH from the system frame number and/or the subframe number, or the RN will determine the time of start to monitor the R-PDCCH according to the time when the random access response message is received within the receiving window and the time interval.

2. The method according to claim 1, wherein before the random access of the RN, the RN sends to the base station a dedicated signaling carrying the RN identification information or an MAC control element carrying the RN identification information.

3. A method for the random access of a Relay Node (RN), comprising:
    the RN sending a random access preamble according to RN-dedicated random access resource;
    the RN monitoring Relay Physical Downlink Control Channel (R-PDCCH), receiving a RN-dedicated random access response message according to a random access-radio network temporary identifier on the R-PDCCH, and sending a first scheduled transmission through Relay Physical Uplink Shared Channel (R-PUSCH) according to the Uplink Grant information in the RN-dedicated random access response message; and
    the RN monitoring the R-PDCCH, and receiving a Contention Resolution message according to a cell-radio network temporary identifier or a temporary cell-radio network temporary identifier on the R-PDCCH,
    wherein the RN-dedicated random access response message contains at least one of the following: Uplink Grant information which is used to indicate the RN to perform transmission through Relay Physical Uplink Shared Channel (R-PUSCH), handover time of switching from monitoring the PDCCH to monitoring the Relay Physical Downlink Control Channel (R-PDCCH), and a RN indication bit,
    wherein if the random access response message does not contain the handover time and the random access response message contains the Uplink Grant information of the R-PUSCH, then the RN will start to monitor the R-PDCCH after a predetermined time since sending through R-PUSCH; and if the random access response message does not contain the handover time and the random access response message does not contain the Uplink Grant information of the R-PUSCH, then the RN will start to monitor the R-PDCCH immediately, and
    wherein if the random access response message contains the handover time, then the RN will start to monitor the R-PDCCH from the system frame number and/or the subframe number, or the RN will determine the time of start to monitor the R-PDCCH according to the time when the random access response message is received within the receiving window and the time interval.

4. The method according to claim 3, wherein
    the RN-dedicated random access response message contains the Uplink Grant information which is used to indicate the RN to perform transmission through the R-PUSCH.

5. The method according to claim 3, wherein
    the RN-dedicated random access resource comprises at least one of the following:
RN-dedicated random access preamble, time domain resource of RN-dedicated physical random access channel, frequency domain resource of RN-dedicated physical random access channel.

6. The method according to claim 3, wherein
    before the RN performs the random access, the method of the RN acquiring the RN-dedicated random access resource comprises: acquiring the same from system information carrying RN-dedicated random access resource or a dedicated signaling carrying the RN-dedicated random access resource.

7. The method according to claim 3, wherein
    the step that the RN sends the random access preamble according to the RN-dedicated random access resource comprises: the RN sending a RN-dedicated random access preamble through random access channel of the UE, or sending a random access preamble of the UE through RN-dedicated random access channel, or sending the RN-dedicated random access preamble through the RN-dedicated random access channel.

8. The method according to claim 3, wherein
before the random access of the RN, the RN sends to the base station a dedicated signaling carrying the RN identification information or an MAC control element carrying the RN identification information.

9. A method for random access of a relay node (RN), comprising:
the RN monitoring Physical Downlink Control Channel (PDCCH) and receiving a RN-dedicated random access response message according to a Random Access-Radio Network Temporary Identifier (RA-RNTI) on the PDCCH,
wherein the RN-dedicated random access response message contains at least one of the following: Uplink Grant information which is used to indicate the RN to perform transmission through Relay Physical Uplink Shared Channel (R-PUSCH), handover time of switching from monitoring the PDCCH to monitoring the Relay Physical Downlink Control Channel (R-PDCCH), and a RN indication bit,
wherein if the random access response message does not contain the handover time and the random access response message contains the Uplink Grant information of the R-PUSCH, then the RN will start to monitor the R-PDCCH after a predetermined time since sending through R-PUSCH; and if the random access response message does not contain the handover time and the random access response message does not contain the Uplink Grant information of the R-PUSCH, then the RN will start to monitor the R-PDCCH immediately, and
wherein if the random access response message contains the handover time, then the RN will start to monitor the R-PDCCH from the system frame number and/or the subframe number, or the RN will determine the time of start to monitor the R-PDCCH according to the time when the random access response message is received within the receiving window and the time interval.

10. The method according to claim 9, wherein
the handover time is a system frame number and/or a subframe number when a RN starts to monitor the R-PDCCH, or a time interval from the time when the random access response message is received to the time of starting to monitor the R-PDCCH within a receiving window.

11. The method according to claim 9, wherein
before the random access of the RN, the RN sends to the base station a dedicated signaling carrying the RN identification information or an MAC control element carrying the RN identification information.

12. The method according to claim 9, wherein after the random access of the RN, the RN switches from monitoring the PDCCH to monitoring the Relay Physical Downlink Control Channel (R-PDCCH) according to the RN-dedicated random access response message.

13. A method for random access of a relay node (RN), comprising:
the RN sending to a base station a dedicated signaling carrying RN identification information or a Media Access Control (MAC) control element carrying RN identification information according to the Uplink Grant information in a random access response message; and
the RN monitoring Physical Downlink Control Channel (PDCCH), and receiving a RN-dedicated Contention Resolution message according to a Cell-radio Network Temporary Identifier (C-RNTI) or a temporary cell-radio network temporary identifier on the PDCCH,
wherein the RN-dedicated Contention Resolution message contains at least one of the following: Uplink Grant information which is used to indicate the RN to perform transmission through Relay Physical Uplink Control Channel (R-PUSCH), handover time of switching from monitoring the PDCCH to monitoring the Relay Physical Downlink Control Channel (R-PDCCH), resource information of the R-PDCCH and RN identification information, and
wherein if the Contention Resolution message does not contain the handover time, then the RN will immediately start to monitor the R-PDCCH; and if the Contention Resolution message contains the handover time, then the RN will start to monitor the R-PDCCH from the system frame number and/or the subframe number.

14. The method according to claim 13, wherein the handover time is a system frame number and/or a subframe number when the RN starts to monitor the R-PDCCH, or a time interval from the time when the RN feedbacks to the base station the successful receipt of the Contention Resolution message to the time of starting to monitor the R-PDCCH.

15. The method according to claim 13, wherein after the random access of the RN, the RN switches from monitoring the PDCCH to monitoring the Relay Physical Downlink Control Channel (R-PDCCH) according to the RN-dedicated Contention Resolution message.

* * * * *